United States Patent
Wurst et al.

[11] Patent Number: 5,533,404
[45] Date of Patent: Jul. 9, 1996

[54] MOLD PRESSURE SENSOR BODY

[75] Inventors: Richard Wurst, Williamsburg; Rodney J. Groleau, Traverse City, both of Mich.

[73] Assignee: RJG Technologies, Inc., Traverse City, Mich.

[21] Appl. No.: 353,178

[22] Filed: Dec. 9, 1994

[51] Int. Cl.[6] .............................. G01L 5/00; B29C 45/76
[52] U.S. Cl. ................................ 73/756; 73/866.5
[58] Field of Search ...................... 73/866.5, 151, 73/155, 768, 862.541, 862.69, 756

[56]  References Cited

U.S. PATENT DOCUMENTS

| | | | |
|---|---|---|---|
| 2,036,458 | 4/1936 | Carlson | 73/768 |
| 4,412,456 | 11/1983 | Wilhelm et al. | 73/768 |
| 4,621,503 | 11/1986 | Woods et al. | 73/862.69 |
| 4,630,490 | 12/1986 | Malicki | 73/768 |
| 4,643,026 | 2/1987 | Betterton et al. | 73/756 |
| 4,730,497 | 3/1988 | Rabensteiner et al. | 73/768 |
| 4,760,749 | 8/1988 | Groleau | 73/866.5 |
| 4,766,764 | 8/1988 | Trevillion | 73/151 |
| 4,850,227 | 7/1989 | Luettgen et al. | 73/756 |
| 4,879,903 | 11/1989 | Ramsey et al. | 73/756 |
| 5,138,876 | 8/1992 | Moore et al. | 73/155 |
| 5,295,393 | 3/1994 | Thiercelin | 73/155 |
| 5,353,873 | 10/1994 | Cooke, Jr. | 73/155 |
| 5,377,548 | 1/1995 | Ballivy | 73/768 |
| 5,402,689 | 4/1995 | Grogan | 73/768 |

FOREIGN PATENT DOCUMENTS 0545720  3/1977  U.S.S.R. ................... 73/768

OTHER PUBLICATIONS

RJG Flyer—T412, 413, 414 Button Mold Transducer.
RJG Ruggedized Mold Pressure Transducers—Flyer.
DME Slide Mold Pressure Sensors SS–405C & SS–406C Two Page Flyer.

*Primary Examiner*—Kenneth A. Wieder
*Assistant Examiner*—George M. Dombroske
*Attorney, Agent, or Firm*—James M. Deimen

[57]  ABSTRACT

A generally rectangular mold pressure sensor body contains an electro-mechanical sensing element designed to engage and be actuated by a mold ejector pin. The plastic body is generally rectangular in side view with appendages extending from either side of the body in plan view. The appendages engage pockets milled into channel sidewalls in the mold ejector plate. These appendages position the sensing element under the ejector pin, and retain the sensor body in the mold ejector plate. Extending from the forward end of the sensor body is a tongue of less thickness than the sensor body. The tongue may be removed to adjust the location of the sensing element relative to the end of the channel.

22 Claims, 1 Drawing Sheet

MOLD PRESSURE SENSOR BODY

BACKGROUND OF THE INVENTION

This invention pertains to means for measuring the fluid pressure of plastic in a mold cavity. In particular, the axial force exerted on a mold ejector pin or dummy pin by plastic in a mold cavity is sensed with an electro-mechanical sensor or transducer. Piezo-electric and electro-mechanical transducers housed in steel bodies are available for the measurement of these forces.

In a typical application, the sensor is positioned in a slot milled into the mold ejector plate such that the center of the sensing element is aligned with the center of the ejector pin or dummy pin. The lead wires from the sensor are brought out of the mold through a channel in the mold ejector plate. In cases where the lead wire channel cannot be straight, or the channel must be smaller than the width of the sensor, a peanut shaped or a button mold pressure sensor may be used.

A generally peanut shaped mold pressure sensor as disclosed in U.S. Pat. No. 4,760,749 may be used where a constant radius full width slot is required. The constant radius full width slot allows the sensor to be inserted and removed from the ejector plate without disassembly of the mold or ejector plate. Alternatively, an oblong pocket and a smaller channel in the mold ejector plate may be used. Use of the smaller channel with the peanut shaped sensor eliminates the option of inserting and removing the sensor without mold disassembly.

Button mold pressure sensors are characterized by T-412 and T-413 sensors supplied by RJG Technologies, Inc., Traverse City, Mich. Button mold pressure sensors are typically installed in a pocket under a mold ejector pin and cannot be removed without disassembling the mold ejector plate and ejector retainer plate.

Where a straight full width channel extends to the edge of the ejector plate, an oblong slide mold pressure sensor can be inserted or removed from the mold without dismantling the mold or ejector plate. Slide mold pressure sensors are characterized by the D-M-E Standard SS-405C and SS-406C sensors from D-M-E Company, Madison Heights, Mich. Slide sensors are generally rectangular in shape and have a Teflon or polyvinyl chloride coated cable enclosed in a flexible armored jacket leading from the sensor.

The cable and armored jacket leading from the sensor are not structurally rigid and the user must provide a means to retain the slide sensor in the ejector plate channel. A common method for retaining the slide sensor is with a friction spring attached to the top surface of the sensor. The friction spring is not always sufficient to retain the sensing element in the desired location.

The sensing element of the slide sensor is located by the side walls of the channel, and the end of the channel. Two standard configurations exist for the slide sensor. The difference between the two configurations is that the sensor body is one-eighth inch longer from the sensing element to the tip end of the sensor body. The two configurations are not easily interchangeable in the field. Additionally, a slot that is milled too long will incorrectly locate the sensor element of either transducer. In such a situation, the transducer is spaced from the end of the slot with an insert, or the ejector plate is reworked.

SUMMARY OF THE INVENTION

This invention comprises a plastic mold pressure sensor body generally rectangular in side view with four appendages, two extending from either side of the body in plan view. The plastic body is molded around a stainless steel sensing element containing electro-mechanical means to measure the force applied by a mold ejector pin or dummy pin.

The principal objective of this invention is to provide a mold pressure sensor with a mechanically simple, yet secure method for retaining the sensor in a mold ejector plate. The appendages molded as part of the plastic body engage openings machined into the sensor channel, holding the sensor in place.

A further objective of this invention is to provide additional positive means to align the centerline of the sensing element with the centerline of the mold ejector pin. The molded appendages, being a specific distance from the centerline of the sensing element, accomplish this objective. Where the channel or slot has been machined too far into a mold ejector plate, the appendages alone can be used to locate the sensor.

The sensor can be inserted into or removed from a straight, blind channel without disassembly of the mold ejector plate. As the sensor is inserted or removed, the appendages fold inward toward the sensor body.

Attached to the sensor body is a flexible cable containing the leadwires from the sensing element. The cable is molded into the plastic body providing a secure, sealed passageway for the leadwires. At the opposite end of the cable is a fitting, electrical junction box and a standard connector for attachment of extension cables.

The plastic sensor body incorporates a tongue on its forward end near the sensor element. The tongue extends one-eighth inch from the main body of the transducer and may be removed to adapt to slots or channels machined for the shorter slide sensor standard.

DESCRIPTION OF THE PREFERRED EMBODIMENTS

Figure 1:
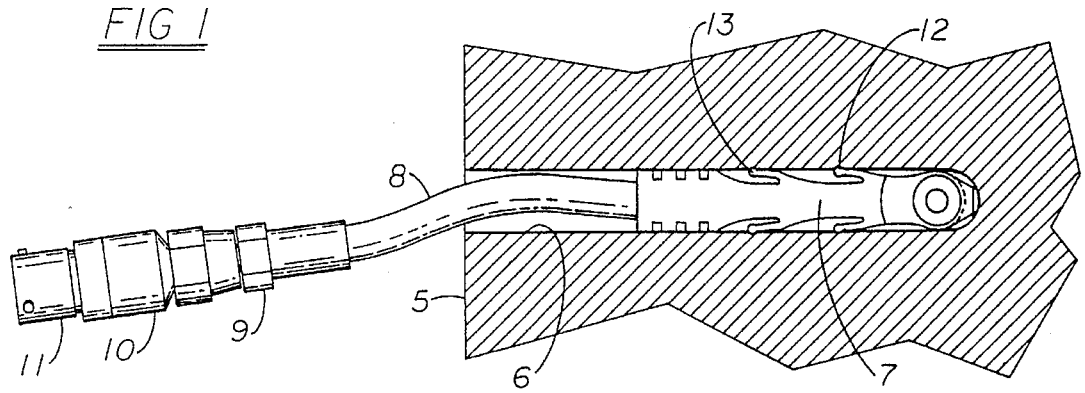
FIG. 1 is a partial section view of the new sensor installation in a mold ejector plate.
Figure 2:
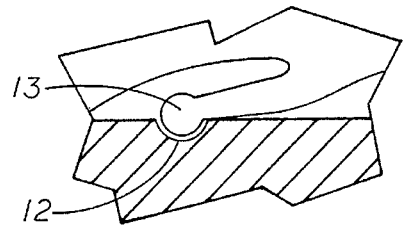
FIG. 2 is a partial blown-up view of the transducer appendages engaging channels in the mold ejector plate.
Figure 3:
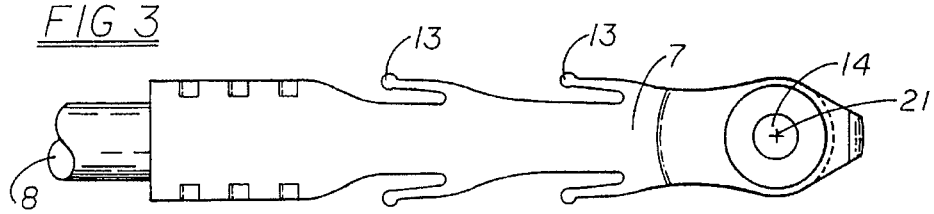
FIG. 3 is a plan view of the new transducer body.

Illustrated in FIGS. 1, 2 and 3 is a segment of a mold ejector plate 5 and mold pressure sensor body 7 showing the installation of the new mold pressure sensor. The mold pressure sensor body 7 is inserted into a straight channel 6 in the mold ejector plate 5. Four pockets 12 (grooves, means for receiving or similar means) are formed into the channel wall 6 to engage and retain the mold pressure sensor body 7 resilient appendages 13. As is best seen in FIG. 2, the mold pressure sensor body 7 appendages 13 are urged outwardly to engage the pockets 12 in the mold ejector plate 5. The appendages 13 terminate with a partially cylindrical portion as shown which facilitates the retention of the appendages in the pockets and hence also the retention of the mold pressure sensor body 7 in the desired position in the mold ejector plate 5.

However, where the channel 6 is excessively long (although not shown) the mold pressure sensor body 7 can be inserted farther into the channel wherein the appendages 13 will resiliently engage the channel walls as the appendages are beyond the pockets 12, i.e., closer to the end of the channel 6 than the pockets. In this instance, should there be inadvertent withdrawal movement of the sensor body 7, the sensor body 7 will still be constrained when the appendages 13 engage the pockets 12. Thus, the appendages 13, when engaged with the pockets 12, prevent undesired removal of the sensor body 7 from the channel 6 and require purposeful force applied to withdraw the sensor body from the channel 6.

Figure 4:
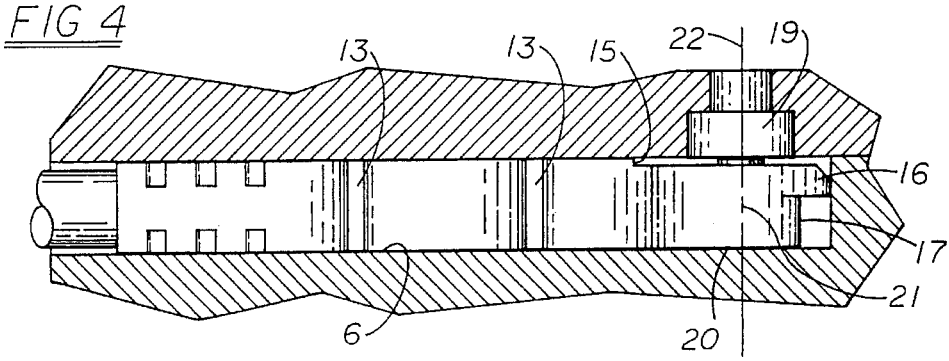
FIG. 4 is a side view of the new transducer body.

The mold pressure sensing body 7 contains a stainless steel sensing element 14 that is surrounded radially by the plastic which forms the mold pressure sensor body. The upper portion of the sensing element is exposed to interface with a mold ejector pin 19 as shown in FIG. 4. A step relief 15 is formed on the plastic mold pressure sensor body 7 to provide clearance between the mold pressure sensor body and the ejector pin.

Signals from the sensing element 14 are conveyed by leadwires (not shown) running inside a flexible, protective cable 8. The cable 8 is molded to the plastic mold pressure sensor body 7 and is terminated with a fitting 9. Attached to the fitting 9 is an electrical junction box 10 and a standard connector 11. The electrical junction box 10 may contain electronics which amplify the sensor signals.

As illustrated in FIGS. 3 and 4, the mold pressure sensor body 7 is generally rectangular in side view with four appendages 13, two extending from either side of the body in plan view. The appendages 13 are flexible and resilient, and fold inward toward the mold pressure sensor body 7 during installation and removal from the mold ejector plate 5. Additionally, the appendages 13 are located specific distances to either side from the sensing element 14 allowing the sensor to be located solely by the appendages if so desired.

The sensing element 14 is located at the forward end of the body 7 and is radially enclosed by plastic. The upper portion of the sensing element 14 is exposed and engages a mold ejector pin 19. The lower portion of the sensing element 14 rests on the bottom of the channel 6 in the mold ejector plate 5 at 20. The centerline 21 of the sensing element 14 is aligned with the centerline 22 of the ejector pin 19 by the appendages 13, or by a combination of the appendages 13 and the sensor tongue 16 on the forward tip of the body. The sensor tongue 16 engages the end of the channel 6 as shown in FIG. 4.

Figure 5:
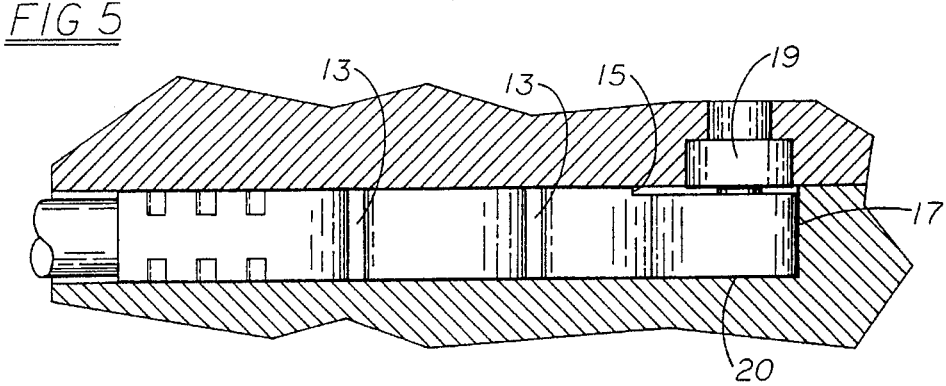
FIG. 5 is a side view of the transducer body with the tongue on the forward end removed.

In cases where the channel 6 is formed for the shorter slide sensor standard, the tongue 16 can be easily removed. FIG. 5 shows a side view of the installation of the mold pressure sensor body 7 with the tongue 16 removed and in the shorter channel. The tip 17 of the mold pressure sensor body 7 matches the contour and engages the end of the channel 6.

I claim:

1. A plastic injection mold pressure sensor body having a sensing element, the sensing element having a preferred centerline, and at least one integral resilient appendage projecting from the sensor body in a direction transverse to the centerline, said appendage adapted to transversely urge said sensor body against a channel wall in a mold ejector plate.

2. The mold pressure sensor body according to claim 1 wherein the mold pressure sensor body is a generally rectangular body.

3. The mold pressure sensor body according to claim 2 wherein the appendage projecting from the sensor body extends from one side of the generally rectangular body and at least one other appendage projecting from the sensor body extends from an opposite side of the generally rectangular body.

4. The mold pressure sensor body according to claim 1 wherein at least one appendage terminates in a partial cylindrical portion.

5. A plastic injection mold pressure sensor body holding a sensing element with a preferred sensing direction and positioned in relation to a mold ejector plate, the mold pressure sensor body having integral resilient means for engaging and retaining the sensor body to the mold ejector plate.

6. The mold pressure sensor body according to claim 5 wherein the means for engaging and retaining the sensor body to the mold ejector plate comprises at least one appendage projecting from the sensor body in a direction non-parallel to the sensing direction of the sensing element.

7. The mold pressure sensor body according to claim 5 wherein the mold ejector plate has means therein for receiving the sensor body and wherein the means for receiving the sensor body are formed at a specific location to receive and engage the means for engaging and retaining the sensor body.

8. The mold pressure sensor body according to claim 7 wherein the mold ejector plate has a channel formed therein and the means for receiving the sensor body are disposed in the channel.

9. The mold pressure sensor body according to claim 7 wherein the means for receiving the sensor body located in the ejector plate comprise pockets.

10. The mold pressure sensor body according to claim 9 wherein the sensing element has a center line and at least two pockets on the mold ejector plate are equidistant from the sensing element centerline.

11. The mold pressure sensor body according to claim 5 wherein the means for retaining the sensor body has a specific distance to the sensing element.

12. In a mold having a mold ejector plate and a mold pressure sensor body having a sensing element, the sensor body being arranged in a channel in the mold ejector plate, and the channel having walls and an end, the improvement comprising means on the sensor body for retaining the sensor body in the channel, and the channel having means at a specific location for positively receiving the means for retaining the sensor body.

13. The mold pressure sensor body according to claim 12 wherein means for retaining the sensor body in the channel comprise at least one resilient appendage.

14. The mold pressure sensor body according to claim 12 wherein the means for positively receiving in the channel comprise at least one pocket.

15. The mold pressure sensor body according to claim 12 further comprising leadwires extending from the sensor body and through the channel.

16. The mold pressure sensor body according to claim 15 further comprising flexible cable attached to the sensor body, the flexible cable surrounding the leadwires.

17. The mold pressure sensor body according to claim 12 wherein the means for retaining the sensor body to the mold ejector plate channel has a specified distance from the tip of the sensor body, the specified distance being between a distance the means for positively receiving is located from the end of the channel and a lesser distance.

18. The mold pressure sensor body according to claim 12 wherein the means for retaining the sensor body to the mold ejector body are a specified distance from the sensing element.

19. The mold pressure sensor body according to claim 12 wherein the means for retaining the sensor body comprises at least one appendage projecting from the sensor body at a specified location on the body, said appendage urging the sensor body against an opposite wall of the channel.

20. The mold pressure sensor body according to claim 19 comprising at least one other appendage projecting from the sensor body, said other appendage extending from another location on the body.

21. The mold pressure sensor body according to claim 12 wherein the sensor body has a tip, the tip positioning the sensor body against the end of the channel.

22. The mold pressure sensor body according to claim 21 wherein the tip of the sensor body further comprises a tongue extending from the tip of the sensor body for positioning the body against the end of the channel.

* * * * *